US011972505B2

(12) United States Patent
Tucker

(10) Patent No.: US 11,972,505 B2
(45) Date of Patent: Apr. 30, 2024

(54) AUGMENTED IMAGE OVERLAY ON EXTERNAL PANEL

(71) Applicant: Lenovo (Singapore) Pte. Ltd., Singapore (SG)

(72) Inventor: Matthew Tucker, Chapel Hill, NC (US)

(73) Assignee: LENOVO (SINGAPORE) PTE. LTD., Singapore (SG)

(*) Notice: Subject to any disclaimer, the term of this patent is extended or adjusted under 35 U.S.C. 154(b) by 0 days.

(21) Appl. No.: 17/348,451

(22) Filed: Jun. 15, 2021

(65) Prior Publication Data
US 2022/0398785 A1    Dec. 15, 2022

(51) Int. Cl.
*G06T 11/00*    (2006.01)
*G02B 27/01*    (2006.01)

(52) U.S. Cl.
CPC .......... *G06T 11/00* (2013.01); *G02B 27/0172* (2013.01); *G06T 2210/22* (2013.01)

(58) Field of Classification Search
CPC .......................... G02B 27/0172; G02B 27/017
See application file for complete search history.

(56) References Cited

U.S. PATENT DOCUMENTS

| | | | | |
|---|---|---|---|---|
| 2015/0123991 | A1* | 5/2015 | Yarosh | G06V 10/44 345/629 |
| 2016/0150182 | A1* | 5/2016 | Hwang | H04N 13/271 382/154 |
| 2016/0210784 | A1* | 7/2016 | Ramsby | G02B 27/017 |
| 2017/0262247 | A1* | 9/2017 | Yoganandan | G06F 3/1446 |
| 2020/0380905 | A1* | 12/2020 | Chi | G09G 3/20 |
| 2021/0011556 | A1* | 1/2021 | Atlas | G06F 3/0425 |
| 2021/0173480 | A1* | 6/2021 | Osterhout | G06F 3/03547 |

* cited by examiner

*Primary Examiner* — Lixi C Simpson
(74) *Attorney, Agent, or Firm* — Ference & Associates LLC

(57) ABSTRACT

One embodiment provides a method, including: receiving, at an augmented reality device, an indication to display a video stream; identifying, using a processor, a position on a display lens of the augmented reality device on which to display an augmented image of an individual in the video stream, wherein the position on the display lens overlays a portion of an external panel; and displaying, at the position on the display lens, the augmented image of the individual. Other aspects are described and claimed.

14 Claims, 6 Drawing Sheets

AUGMENTED IMAGE OVERLAY ON EXTERNAL PANEL

BACKGROUND

Individuals frequently utilize information handling devices ("devices"), for example laptop and/or personal computers, tablet devices, hybrid devices, smart phones, and the like, to participate in remote meetings (e.g., work-related conferences, social chats with friends and/or family, etc.). More particularly, an individual may utilize their device to connect to an online meeting space (e.g., via a meeting application, etc.) in which they may interact and communicate with other meeting participants (e.g., audibly using a microphone, visually using a camera, a combination thereof, etc.).

BRIEF SUMMARY

In summary, one aspect provides a method, including: receiving, at an augmented reality device, an indication to display a video stream; identifying, using a processor, a position on a display lens of the augmented reality device on which to display an augmented image of an individual in the video stream, wherein the position on the display lens overlays a portion of an external panel; and displaying, at the position on the display lens, the augmented image of the individual.

Another aspect provides an electronic panel, comprising: two adjacently-located cameras positioned on a surface of the electronic panel; one or more infrared light emitting diodes (LEDS) positioned around a border of the electronic panel; a processor; a memory device that stores instructions executable by the processor to: capture, using each of the two adjacently-located cameras, a video image of a user; and transmit the captured video image of the user to an augmented reality device associated with another user.

A further aspect provides an electronic panel, comprising: two adjacently-located cameras positioned on a surface of the electronic panel; one or more infrared light emitting diodes (LEDS) positioned around a border of the electronic panel; a processor; a memory device that stores instructions executable by the processor to: capture, using each of the two adjacently-located cameras, a video image of a user; and transmit the captured video image of the user to an augmented reality device associated with another user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
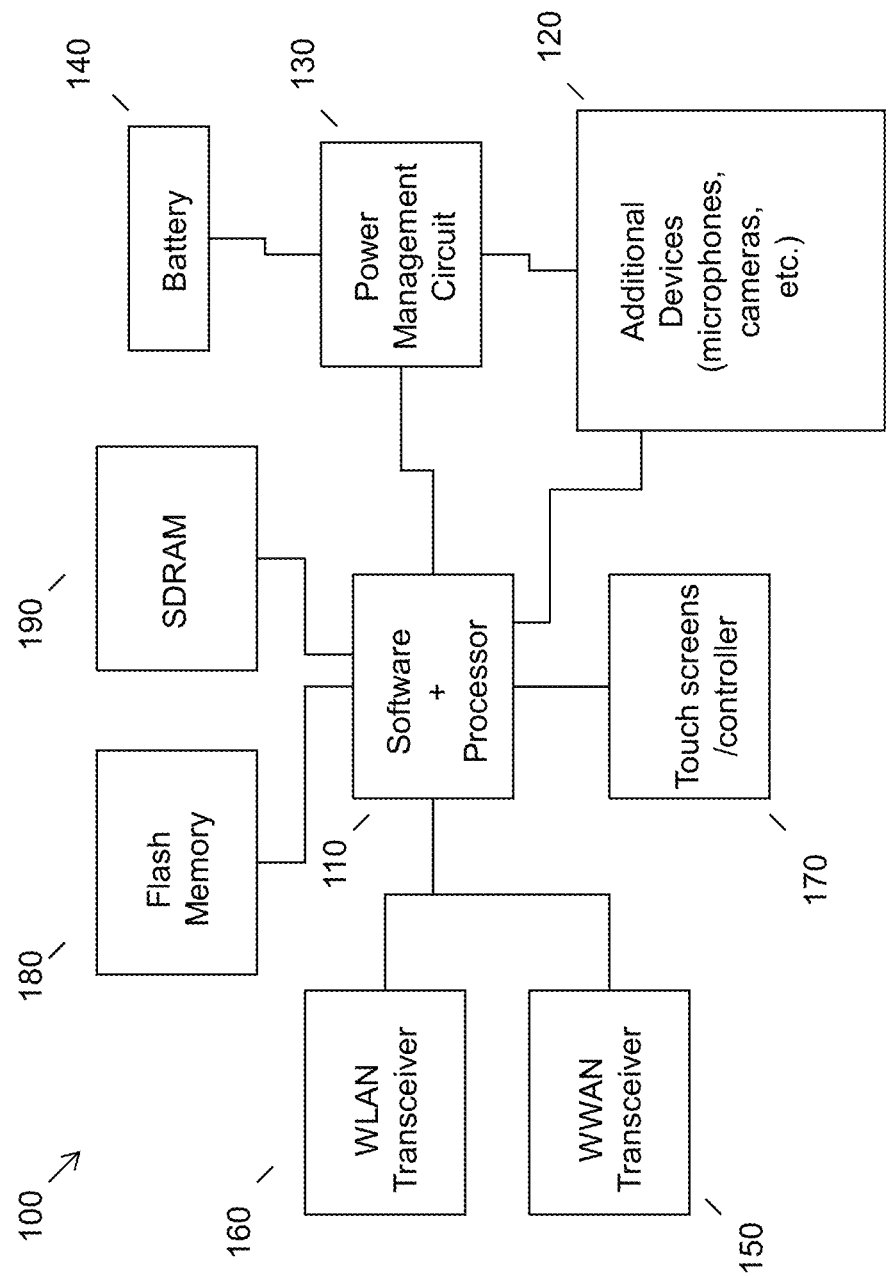
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As many businesses and organizations transition to partial or fully remote work environments, the demand for high-quality remote communication tools has correspondingly increased. Video teleconferencing remains one of the most popular means to enable disparately located individuals to communicate with one another in substantially real-time. Such a remote conferencing method may allow the communicating parties to have face-to-face interactions with each other, thereby partially emulating the natural feel of an in-person conversation.

However, conventional video conferencing tools are severely lacking in their ability to effectively simulate real-life, face-to-face interactions. For example, in many situations the communicating parties do not actually look at each other during a video conversation. More particularly, during a video call users generally look at a display screen that provides the video feed of the other individual. Because the display screen is oftentimes in a different location than a user's camera sensor (e.g., positioned below the camera, etc.), the video feed that each party receives of the other is not an "eye-to-eye" feed (e.g., a video feed received from User B may show them looking downwards rather than directly at User B's eyes). As another example, conventional videoconferencing techniques struggle to effectively support multiple video callers simultaneously. More particularly, when multiple individuals are engaged in a video call with each other, each user's video feed must share space on a display with the video feeds of the other individuals. The resultant screen crowding decreases the size of each individual's video feed box, making it difficult for a viewer to visualize the features and details of each individual. This crowding issue is further exacerbated if various types of media (e.g., slideshow presentations, word documents, images/videos, etc.) are simultaneously presented on the display.

Various solutions currently exist that attempt to restore the eye contact that is lost when video conferencing. For example, one solution involves dynamically manipulating the video stream to simulate eye contact. More particularly, various types of software may be utilized to identify the gaze locations of each user's eyes and thereafter dynamically edit the incoming frames of the video feed to make each user appear as if they were looking directly at the camera when speaking and therefore into each other's eyes. However this solution has limited effectiveness in that it does not always optimally achieve its purpose and can create unnatural and distracting artifacts of eye movement. For example, if one caller intentionally looks away, the computer software may continue attempting to make that caller's eyes look like they are looking at the camera, resulting in an awkward scene.

Another existing solution relies on teleprompter-style displays, in which a two-way mirror bounces the image from the actual display toward the caller while also letting light pass through toward a camera. In this way, the image of the other caller can be aligned with the camera, letting each caller look at the irrespective camera when they are looking at the image of the other caller. This approach, however, requires a large amount of physical space due to the geometry of the mirror, display, and/or camera assembly. Specifically, displaying multiple callers at life size would be space-prohibitive in most desk areas.

Accordingly, an embodiment provides a method for presenting an augmented image of an individual overtop of a portion of an external panel. In an embodiment, an indication may be received by an augmented reality device (e.g., a head-mounted display device (HMD), augmented reality system, augmented reality glasses, etc.) to display a video stream (e.g., on a display lens of the augmented reality device, a display associated with the augmented reality device, etc.). This video stream may be a video of another individual that a user of the augmented reality device is engaged in a videoconference with. An embodiment may then identify a position on the display lens of the augmented reality device to display the video stream. In this regard, an embodiment may identify a portion of an external panel within a field of view of the augmented reality device on which to overlay an augmented image of the individual and thereafter correlate this identified portion with a position on the display lens. As a result of the foregoing process, a user of the augmented reality device may perceive a larger and clearer image of the other individual overlaid on top of the external panel.

The external panel may include functionality that allows the system to determine different information about the system and the individuals or users engaged in the video conference. For example, the external panel may include sensors, for example, light-emitting diodes (LEDs), position sensors, and the like, that allow the system to identify the location of the external panel with respect to other components of the system, for example, other panels, the head-mounted augmented reality device, other sensors, and the like. This information can be used by the system to more accurately generate images to be viewed by video conference participants. The external panels may also include other sensors or components to identify other information, for example, cameras that track a position of the a user's eyes or gaze, accelerometers or gyroscopes to determine a position of the panel within an environment, and the like. The information captured from the panels allows for a more accurate remote video conferencing system.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
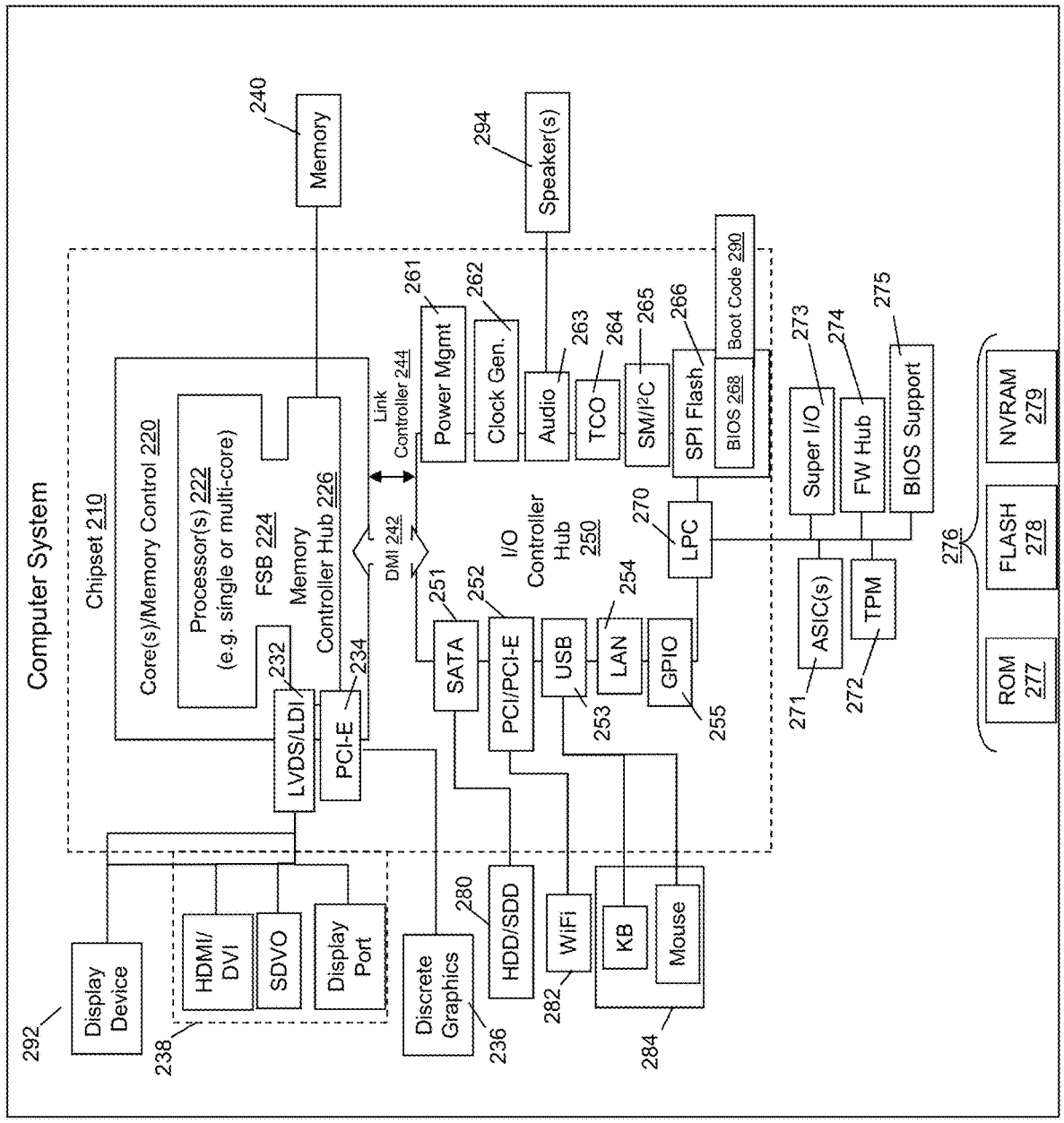
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices used within an augmented reality device or system that generates and displays augmented reality images or within an external panel used within the described system. For example, the circuitry outlined in FIG. 1 may be implemented in a smart phone or tablet embodiment, whereas the circuitry outlined in FIG. 2 may be implemented in a laptop.

Figure 3:
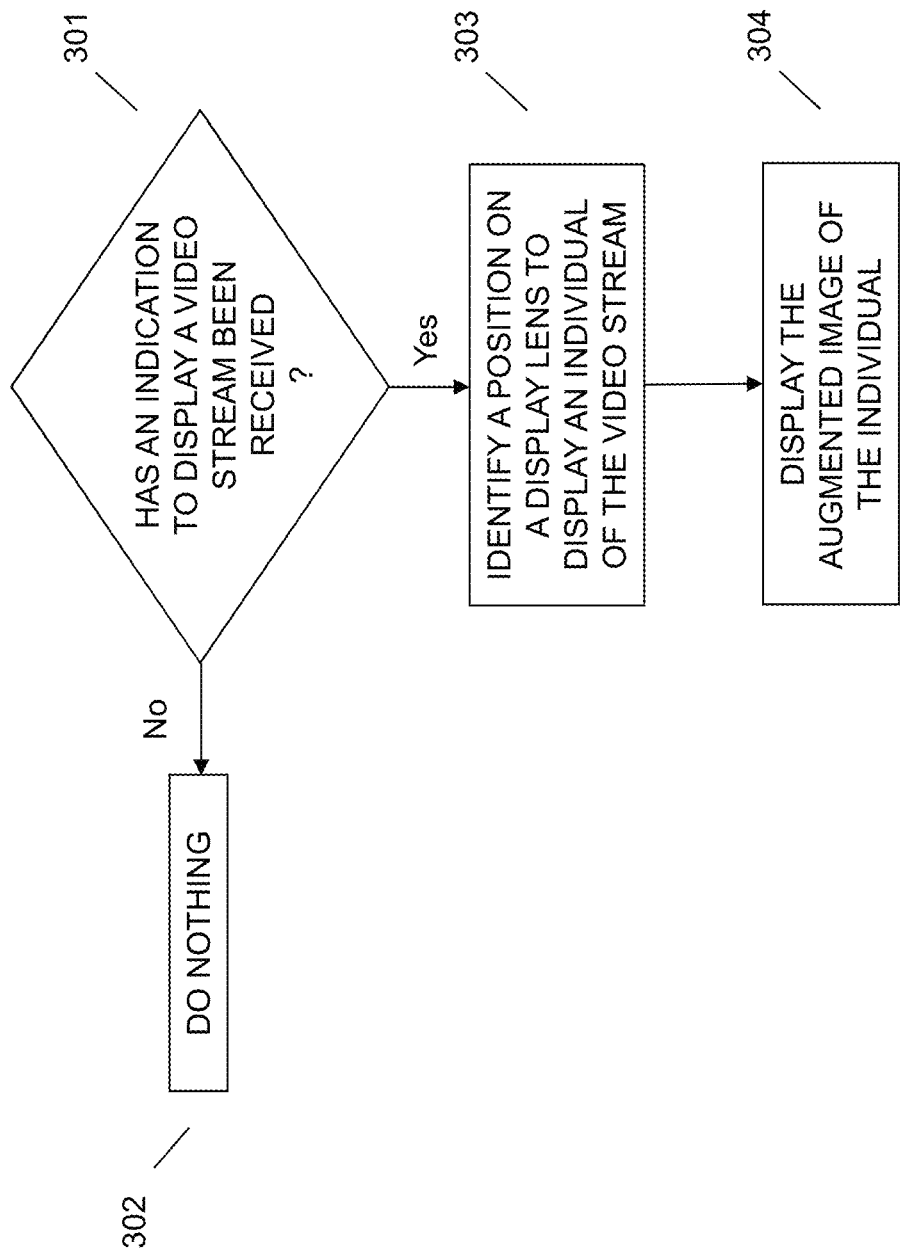
FIG. 3 illustrates an example method of aligning an augmented image of an individual with a specific portion of an external panel.

Referring now to FIG. 3, an embodiment provides a method of aligning an augmented image of an individual with a specific portion of an external panel. At 301 the system determines if an indication to display a video stream has been received at an augmented reality device or system. The augmented reality device may include a headset, glasses, display, or the like, which allows for the generation and display of virtual objects in addition to real objects. Virtual objects are contrasted with real objects in that virtual objects are images of objects (e.g., landmarks, people, animals, etc.) that do not physically exist in the environment where the image is being presented. Real objects are those objects that are physically present within the environment. The augmented reality device or system may include many different components that may be included within a single device or may be multiple devices that are operatively connected together, for example, mechanically connected together, electronically connected together via wire or wireless communication technology, or the like. For example, the augmented reality device or system may include a display lens or lenses, sensors and/or cameras for detecting or capturing information regarding objects and/or the environment (e.g., locations of objects, positions of objects with respect to other objects, locations or positions of an augmented reality device component within an environment, sizes of objects, etc.), external panels as discussed in more detail herein, and the like.

The indication for display of a video stream may include a user or participant logging into or otherwise opening a video conferencing application, program, or the like, and opening or otherwise allowing video from other participants. Thus, the video stream may include a live video feed of another participant within the video conference. Since the conference may include multiple participants, the system may receive multiple video streams from multiple participants. Thus, the indication may include receipt of one or more video streams.

Additionally, the indication may include receipt of a new video stream or a video stream including a trigger. A new video stream may correspond to a participant engaging in the video conference who was not previously present within the video conference. A video stream including a trigger may be a video stream that has an indication that the participant corresponding to the video stream should be the prominent video stream. Thus, the triggers may include some indication that the corresponding participant within the video stream is a participant of focus. Some triggers include the participant speaking, a user provided trigger (e.g., the participant selecting an icon that corresponds to a prominent video stream indicator, the participant providing a particular gesture identified by the system as a prominent video stream indicator, the participant being identified as a presenter, primary focus, host, or the like, within the system or application, etc.), an indication provided by the user receiving the video stream (e.g., the user selecting a particular video stream, a user selected default video stream, a user selected favorite video stream, the user speaking to a particular other participant, etc.), or the like. The triggers may be detected using different techniques based upon the type of trigger. For example, triggers that are selected by the user within the system may be detected within the programming of the application itself, whereas triggers that are detected through the video (e.g., gestures, audio, etc.) may be detected using sensors (e.g., cameras, gaze tracking, microphones, etc.) of the system that then provide feedback and instructions to the system.

If no indication is received at 301, the system may do nothing at 302, meaning the system may not provide any video to the user related to the video conference. The inaction may occur if the user has selected to not have video displayed, does not have a display device connected to the system, or no video conference has been engaged. On the other hand, if an indication is received at 301, the system may identify, using a processor, a position on the display lens of the augmented reality device to display an augmented image of the individual or video conference participant within or who corresponds to the video stream.

The described system includes external panels (i.e., panels which are external to the augmented reality headset but that are operatively coupled to the headset meaning the panels communicate with the headset). Thus, the position for displaying the augmented image may be a position which overlays a portion of one or more external panels. Stated differently, the position that the augmented image is presented on a display lens may be such that at least a portion of the external panel acts as a type of backdrop to the image. This allows the image to be more readily viewable to the user as ambient light does not affect the image due to the backdrop. To further enhance the viewability of the image, the external panel may be a dark color or surface in order to further reduce the affect of the ambient light. Additionally, the positioning of the image may correspond to particular points on the external panel as discussed in more detail herein.

Figure 4:
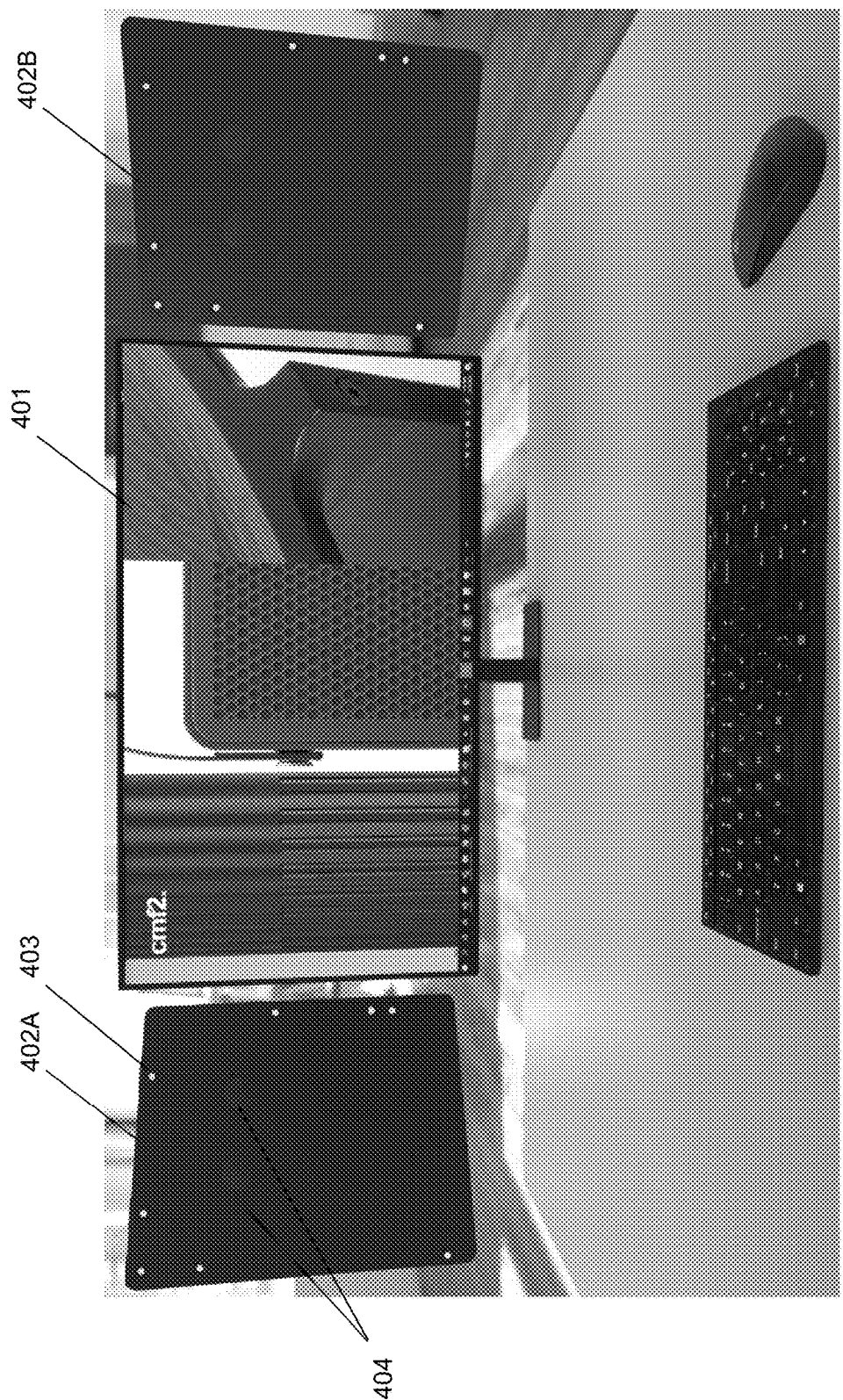
FIG. 4 illustrates an example of an augmented display system including two external panels.

The external panels provide a landing area for the augmented reality image of the participant. The external panel(s) may include components in addition to simply a surface. FIG. 4 illustrates an example system set up including a central monitor or display 401. The central monitor or display corresponds to the computing system that the user uses to access the video conference, for example, a laptop, personal computer, tablet, smartphone, television, or the like. The illustration of FIG. 4 includes two external panels 402A and 402B which communicate with the augmented reality head-mounted display, headset, glasses, or the like, collectively referred to as "augmented reality headset" and not shown.

The external panels include sensors 403 that can provide information to determine a position of the augmented reality headset with respect to the external panel(s). The sensors may be located in different locations around a border of the panel, as illustrated in FIG. 4, or may be located in other locations on the panel. The sensor information or information from other sensors may also provide information regarding the position of a panel with respect to other panels or other components within the computing system. The sensors 403 may be light-emitting diodes (LEDs) that can emit light and receive light reflections that are used to identify timing information that can then be used to calculate distances and positions between the panel having the LED and the object that provided the light reflection. The LEDs may include lasers, infrared, or other visible or invisible light wavelengths within the light spectrum. Alternatively, the LEDs may be detectable by the headset such that the headset can identify the location of the panel. Thus, the system can detect the one or more LEDs and, based upon the location of the detected LEDs, associate the position of the display lens with the portion of the external panel. In other words, the LEDs provide an outline of the panel to the headset so that the headset can determine where the image should be overlaid so that it corresponds to the panel.

Figure 5:
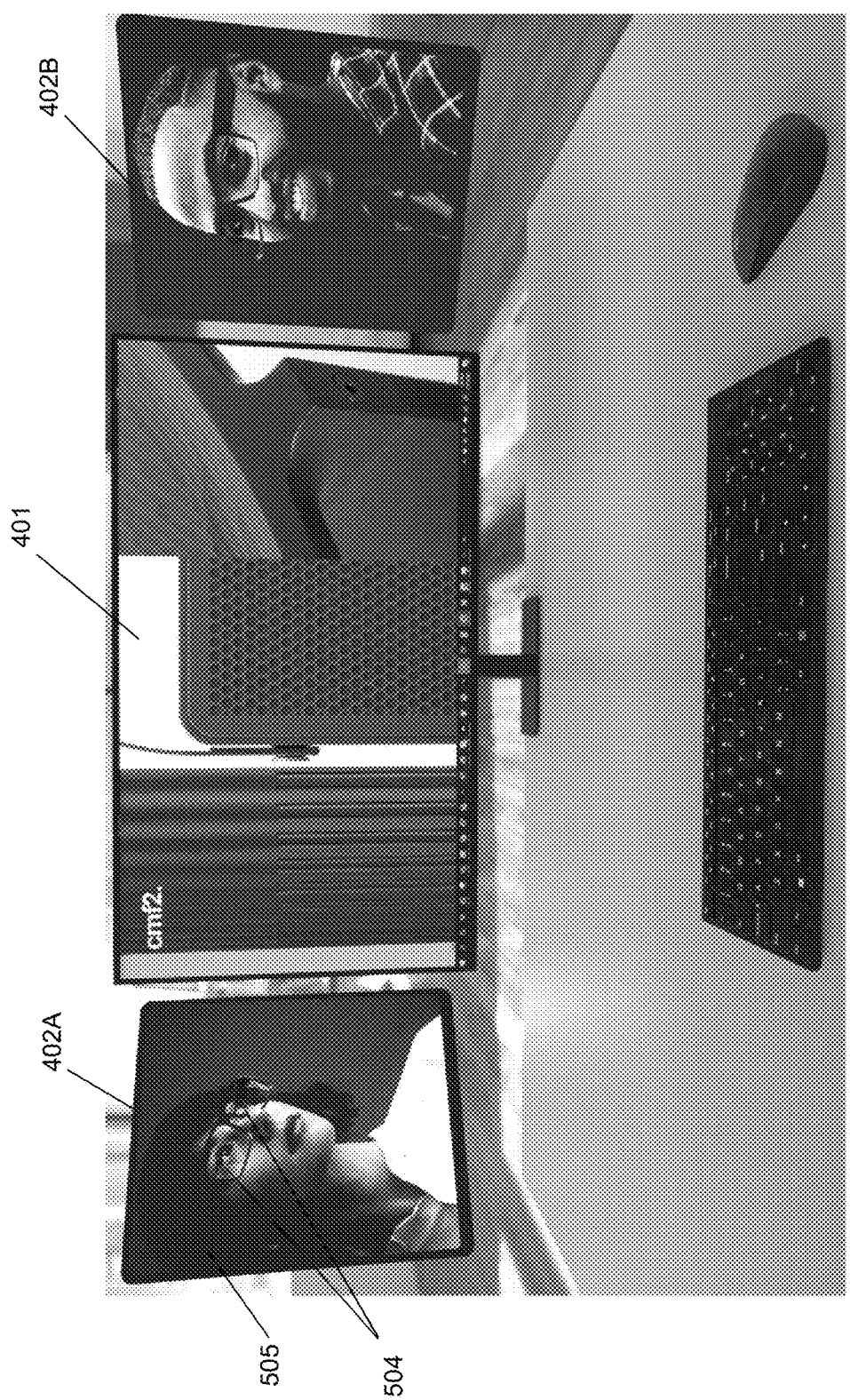
FIG. 5 illustrates an example of an augmented display system including two external panels having augmented images.

The external panels may also include cameras 404. The cameras can be used to capture video of the user. The cameras 404 may be located within the panel(s) at a particular location, for example, at a location such that when the image of another participant is overlaid onto the panel(s), the location of the participant's eyes correspond to or are substantially aligned with the location of the cameras within the panel(s). Accordingly, the cameras may be located horizontal to each other and may be spaced to correspond to an average distance between eyes of people. Thus, as a user is engaging with a participant and looking in the eyes of the participant, the system enables eye contact between the participant and user. Specifically, as the user looks at the image of the participant, the user is looking directly into the cameras which are sending or transmitting the video of the user to the participant via the participant's augmented reality device/system, thereby emulating eye contact as if the user and participant were in the same room. Software included in the system can continually adjust the location of the image so that the eyes of the participants are aligned with the cameras in the panel, for example, as illustrated in FIG. 5, where the eyes 504 of the overlaid image 505 are aligned with the cameras (not shown for illustrative purposes) in the panel 402A. For clarity and illustrative purposes, components 401, 402A, and 402B are duplicated from FIG. 4.

As should be understood by one skilled in the art, a single camera may be used within the panel instead of two cameras. Additionally, the panel may be split into different zones or portions where each portion corresponds to a different participant within the conference. Thus, the panel may have more cameras such that each zone or portion has one or more corresponding cameras.

Figure 6:
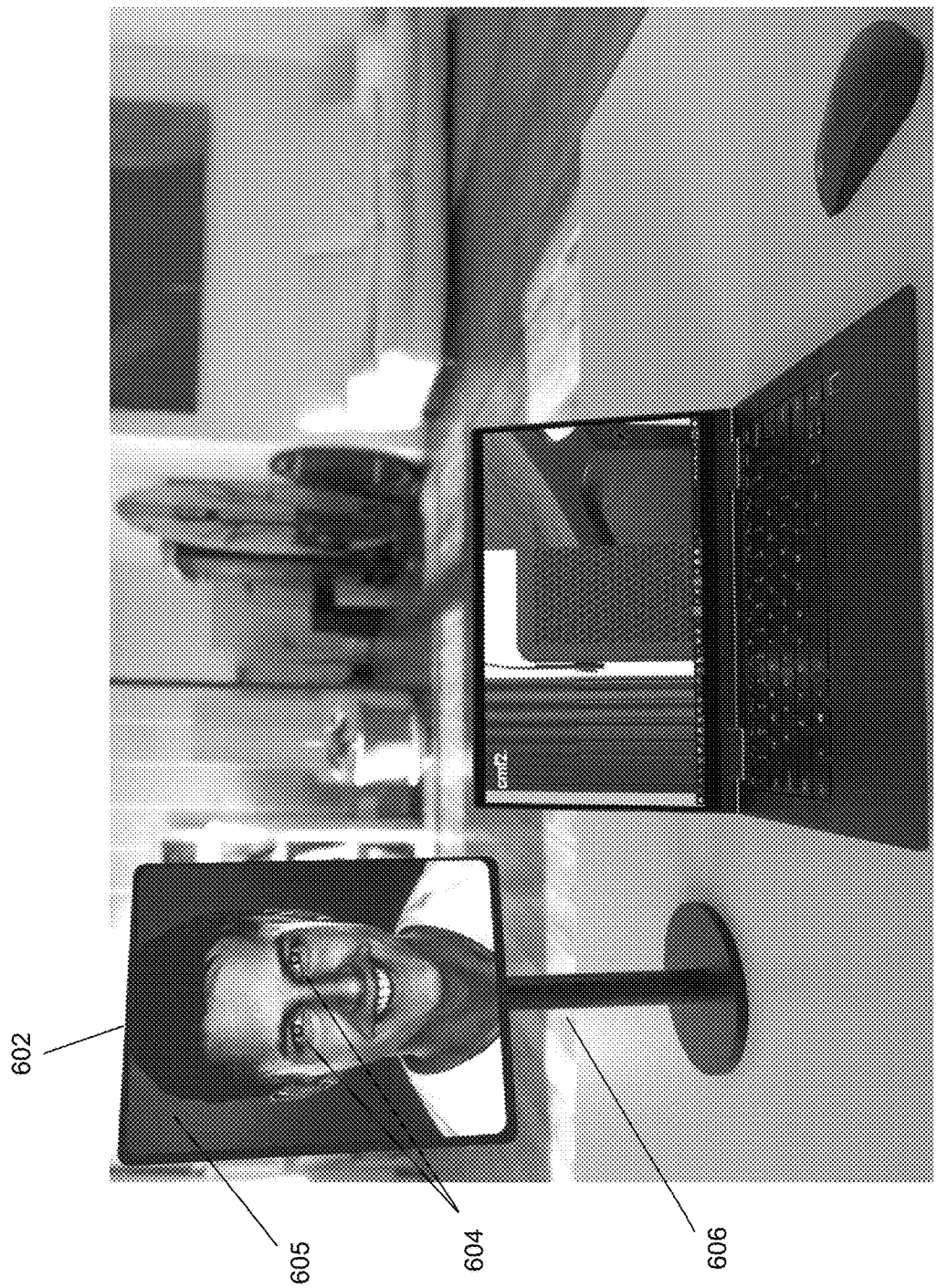
FIG. 6 illustrates an example of an augmented display system including an external panel having an augmented image.

FIG. 6 illustrates an example system having a single panel 602. In FIG. 6, as with FIG. 5, the eyes 604 of the participant corresponding to the overlaid image 605 correspond to the location of the cameras within the panel 602. In this example, the panel 602 includes a stand having a base 606.

As illustrated in FIGS. 4-6, the external panels may be separate from the computing system or central computing monitor. In the examples shown in FIGS. 4 and 5, the panels may be removably mechanically connected to the central monitor, for example, via a bracket, via a fastening mechanism (e.g., hook-and-loop, snaps, buckles, pegs and receiving portions, etc.), or the like. As shown in FIG. 6, the panel(s) may be separate from the computing system or central computing monitor and may include components to make it free-standing, for example, the stand illustrated in FIG. 6, a fold-out stand, a pull-out stand, a mounting mechanism, or the like. Alternatively, the panel(s) may be integrated into the central computing system. For example, the panel may fold-out, slide-out, or otherwise disengage from the central computing system, for example, via a hinge, slide-out groove, slides, or the like. The external panel(s) may include power, data, and/or communication cables that are connected to the system and allow communication between components. Alternatively or additionally, the external panel(s) may include some wireless power, data, and/or communication mechanisms, for example, inductive charging mechanisms, wireless communication mechanism, or the like.

Once the position on the display lens has been determined at 303, the system displays the augmented image of the individual, also referred to as the participant, at the determined position at 304. In displaying the augmented image the system may modify the image. The modifications made may be based upon the size or position of the panel. For example, the system may crop the image so that the overlaid image fits within the portion of the external panel. The portion may include the entirety of the panel, for example, in the case of a single participant being overlaid. The portion may also include a portion smaller than the entire panel, for example, if more than one participant is displayed or if the panel is configured to allow more than one participant to be overlaid onto the panel. The system may also perform other image manipulation, for example, filtering backgrounds, sharpening the image, adding filters (e.g., funny faces, adding objects, etc.), or the like.

Based upon the position of panels with respect to other panels, the image manipulation may also include modifying the images based upon these positions. Thus, the panels may include sensors or the system may be able to determine the physical position or location of an electronic panel, also referred to as an external panel, with respect to and in proximity to the target panel. One modification that is based upon this position information may be manipulating the image so that participants communicating to each other appear to be turned towards each other within the overlaid image. As an example, if panel A is on the left side of panel B and the participants corresponding to these panels are communicating with each other, the system may manipulate the overlaid images of the participants corresponding to panel A and panel B so that the participant corresponding to panel A is facing right towards the participant corresponding to panel B who is facing left towards the participant corresponding to panel A. Thus, the two participants appear to be facing each other while communicating with each other.

Since a conference may include more than two participants and each panel may display a single participant, to reduce the number of panels needed within the system, the system may switch the participant displayed on a panel. For example, the system may switch the overlaid image to correspond to the participant who is of focus, for example, the participant who is speaking, the participant identified as the presenter, host, or lead, a participant who is communicating with the user directly, or the like. The displayed participant may vary based upon various factors as discussed above, including user indications of the participant to be displayed, default settings of the system, or the like.

The various embodiments described herein thus represent a technical improvement to conventional methods for video conferencing systems. Using the techniques and system described herein, an embodiment may more accurately depict a conference room environment even though the participants are located remotely from each other. Stated differently, instead of the conventional techniques which artificially changes the viewing location of a participant's eyes or requires expensive bulky hardware, the described system allows a more realistic conferencing environment. This allows for a more conducive conferencing environment that allows participants to feel more connected to other participants even though they are remotely located from each other.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an augmented reality device, an indication to display a video stream comprising a participant of focus;
   identifying, using a processor, a position on a display lens of the augmented reality device on which to display an augmented image of the participant in the video stream, wherein the position on the display lens overlays a portion of an external panel comprising at least two cameras located within the external panel, wherein the external panel is external to the augmented reality device and provides a landing area for the augmented image of the individual, wherein the identifying comprises determining a position of the external panel with respect to the display lens and associating, based on the determining, the position on the display lens with the portion of the external panel; and
   displaying, at the position on the display lens, the augmented image of the participant, wherein the displaying comprises positioning the augmented image on the corresponding portion of the external panel so that eyes of the participant in the augmented image overlaid on the external panel substantially align with the at least two cameras.

2. The method of claim 1, wherein the augmented reality device is a head-mounted display device.

3. The method of claim 1, wherein the external panel is one of: a stand-alone device or an integrated component of an information handling device.

4. The method of claim 1, wherein the displaying comprises dynamically cropping the augmented image of the participant to fit within the portion of the external panel.

5. The method of claim 1, further comprising:
capturing, using the at least cameras, a video image of a user of the augmented-reality device; and
transmitting the captured video image of the user to another augmented reality device associated with another individual.

6. The method of claim 1, wherein the external panel comprises a dark surface.

7. The method of claim 1, wherein the external panel comprises one or more light emitting diodes (LEDs) positioned around a border of the external panel, wherein the determining a position of the external panel comprises detecting the light emitting diodes and wherein the associating is based upon a detected location of the light emitting diodes.

8. An information handling device, comprising:
a display lens;
a processor;
a memory device that stores instructions executable by the processor to:
receive an indication to display a video stream comprising a participant of focus;
identify a position on the display lens on which to display an augmented image of the participant in the video stream, wherein the position on the display lens overlays a portion of an external panel comprising at least two cameras located within the external panel, wherein the external panel is external to the augmented reality device and provides a landing area for the augmented image of the individual, wherein the identifying comprises determining a position of the external panel with respect to the display lens and associating, based on the determining, the position on the display lens with the portion of the external panel; and
display, at the position on the display lens, the augmented image of the individual, wherein the displaying comprises positioning the augmented image on the corresponding portion of the external panel so that eyes of the participant in the augmented image overlaid on the external panel substantially align with the at least two cameras;
wherein the information handling device is an augmented reality device.

9. The information handling device of claim 8, wherein the information handling device is a head-mounted display device.

10. The information handling device of claim 8, wherein the instructions executable by the processor to display comprise instructions executable by the processor to dynamically crop the augmented image of the participant to fit within the portion of the external panel.

11. An electronic panel, comprising:
at least two adjacently-located cameras positioned within a surface of the electronic panel, wherein locations of the cameras are used for positioning an externally projected augmented image on the electronic panel;
one or more infrared light emitting diodes (LEDS) positioned around a border of the electronic panel, wherein the one or more infrared LEDS identify a position of the electronic panel with respect to other components within a computing system;
a processor;
a memory device that stores instructions executable by the processor to:
capture, using each of the at least two adjacently-located cameras, a video image of a user; and
transmit the captured video image of the user to an augmented reality device associated with another user.

12. The electronic panel of claim 11, wherein the electronic panel is a stand-alone device comprising a base.

13. The electronic panel of claim 11, wherein the electronic panel is an integrated component of an information handling device.

14. The electronic panel of claim 11, wherein the instructions are further executable by the processor to identify a physical position of one or more other electronic panels in proximity to the electronic panel.

* * * * *